United States Patent [19]

Haynes et al.

[11] Patent Number: 5,249,599
[45] Date of Patent: Oct. 5, 1993

[54] FLUID FLOW REGULATOR

[76] Inventors: Joel E. Haynes, 18316 Oxnard St., Tarzana, Calif. 91356; James W. Maxwell, 1254 Reilly La., Clarkston, Ga. 30021

[21] Appl. No.: 578,433

[22] Filed: Sep. 10, 1990

Related U.S. Application Data

[63] Continuation-in-part of Ser. No. 463,946, Jan. 8, 1990, abandoned, which is a continuation of Ser. No. 323,210, Mar. 13, 1989, abandoned, which is a continuation of Ser. No. 139,959, Jan. 31, 1987, abandoned.

[51] Int. Cl.$^5$ .............................................. G05D 7/01
[52] U.S. Cl. .................................... 137/501; 137/504
[58] Field of Search ........................ 137/501, 503, 504

[56] References Cited

U.S. PATENT DOCUMENTS

| | | | |
|---|---|---|---|
| 2,646,078 | 7/1953 | Adams | 137/501 X |
| 2,865,397 | 12/1958 | Chenault | 137/501 X |
| 2,984,261 | 5/1961 | Kates | 137/504 |
| 3,196,902 | 7/1965 | Richmond | . |
| 3,502,100 | 3/1970 | Jonson | 137/501 X |
| 3,534,769 | 10/1970 | Leveque | 137/501 |
| 3,768,510 | 10/1973 | Reves | . |
| 3,948,419 | 4/1976 | Polster | . |
| 4,074,693 | 2/1978 | Kates | 137/501 X |

Primary Examiner—Robert G. Nilson
Attorney, Agent, or Firm—Poms, Smith, Lande & Rose

[57] ABSTRACT

A fluid flow regulator has a housing with a cylindrical chamber. A member in the form of a ball having a diameter slightly less than the diameter of the chamber can move within the chamber. In one embodiment, a bypass channel in the chamber extends around the ball. Fluid flow in the inlet passes through the orifice created between the ball and the channel, creating a pressure drop so that the fluid on the inlet side of the ball is at a higher pressure than the fluid on the other side. The resultant pressure force urges the ball against a spring. Fluid on the other side of the ball exits the chamber through a radial outlet slot positioned near the ball. When the inlet pressure and flow increases, the ball moves toward the outlet slot to cover a greater percentage of the outlet slot, which raises the pressure drop into the outlet, thereby compensating for the increased inlet pressure. A second longitudinal channel terminates on the downstream side of the ball. Inlet flow can use the second slot to bypass the ball, but movement of the ball can open or close the second channel to varying degrees. The second channel provides a way of changing the degree of regulation of the flow controller. In another embodiment, fluid is directed to opposite sides of the ball through two channels, a higher pressure and a lower pressure channel. An orifice in the lower pressure channel creates a pressure drop to decrease the pressure in the lower pressure channel relative to the pressure in the higher pressure channel. Increasing flow increases the pressure on the higher pressure side of the ball to urge the ball over a greater portion of the outlet.

25 Claims, 3 Drawing Sheets

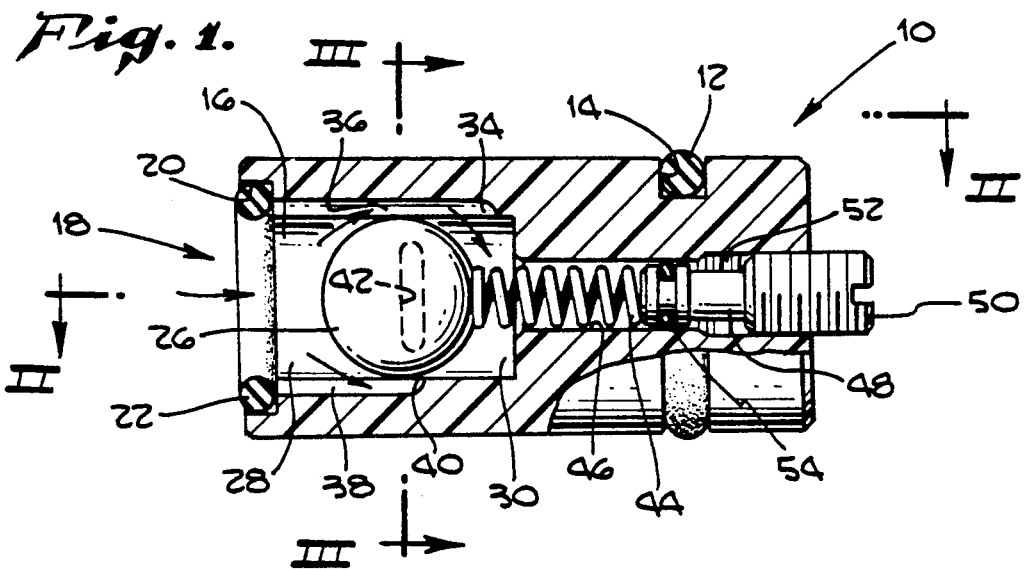
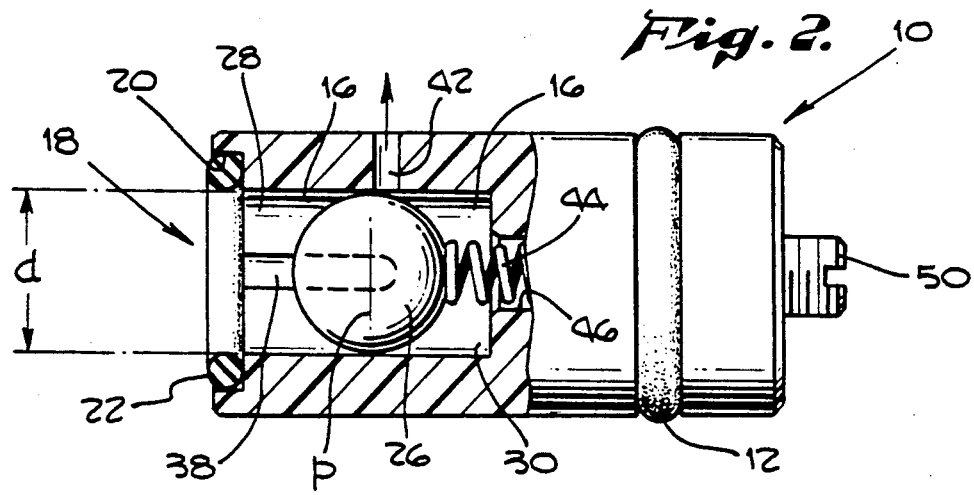
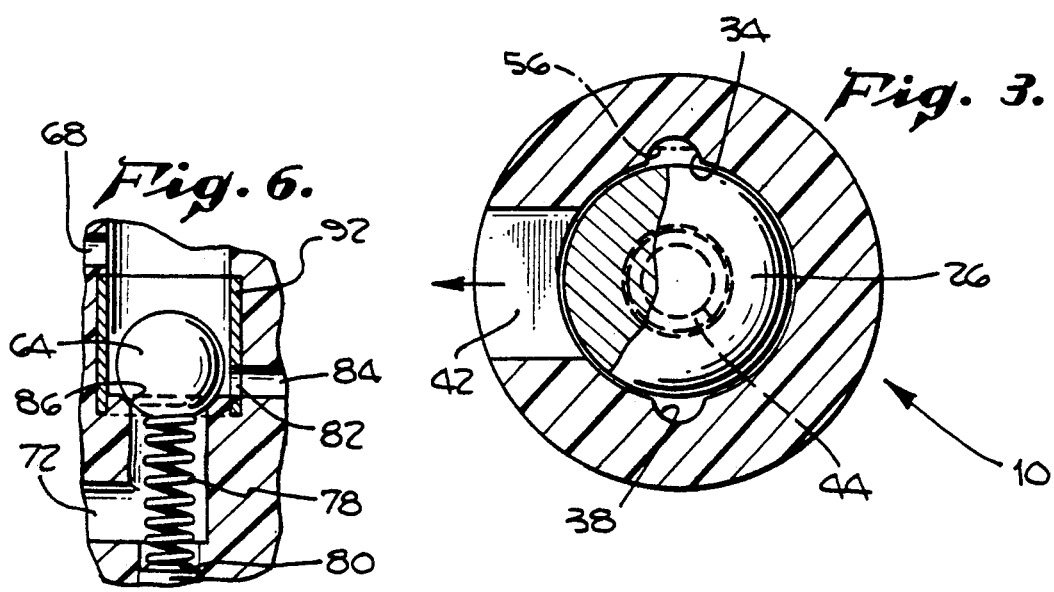

FLUID FLOW REGULATOR

This is a continuation-in-part of application Ser. No. 07/463,946, filed Jan. 8, 1990, now abandoned which is a continuation of Ser. No. 07/323,210, filed on Mar. 13, 1989, now abandoned which is a continuation of Ser. No. 07/139,959, filed on Jan. 31, 1987 now abandoned.

BACKGROUND OF THE INVENTION

1. Field of the Invention

The present invention relates to fluid flow regulators.

2. State of the Art

An ideal fluid flow regulator delivers fluid downstream at a controlled constant flow rate (volume per unit of time) over a wide range of upstream pressure variation. Many known fluid regulators do not achieve the ideal. Some known regulators use a differential pressure drop across a fixed orifice with an active valve correcting flow rates. There are also positive displacement and mass measuring pressure regulators which maintain a fixed pressure drop across an orifice. Differential pressure devices usually require large pressure losses or expensive means for sensing smaller pressure drops, which limit their applications. Positive displacement and mass measuring devices are usually expensive and are often too large for certain applications. Pressure regulators with fixed orifices are also too large for many uses. They are inaccurate in the face of upstream or downstream head pressure variations. Leakage or wear results in worse flow regulation.

Most flow regulators exhibit some degree of positive regulation. Positive regulation is a condition in which flow rate increases with increasing pressure. In many applications, positive regulation is very undesirable. When two fluids are being mixed downstream of the flow regulator, and the pressures on each vary, the proportion of one fluid relative to the other in the mixture can vary to achieve unacceptable results. One area where this occurs is in soft drink dispensing systems. Soft drink dispensers mix syrup and carbonated water to make a soft drink. Slight variations in the percentage of the syrup to water mixture can greatly affect the taste and other quality features of the soft drink.

Current regulators vary ±5% in the amount of water and syrup dispensed over pressure variations that occur in these systems. State of the art flow regulators are also quite expensive to make. They rely on precision machined, stainless steel, piston and sleeve assemblies that are spring biased. The precision machining adds greatly to the cost of the regulators. Also spring biased systems, which rely on spring compression over a distance, do not account for the change in the spring constant as a function of compression. Spring constant error introduces non-linearity to the flow regulator.

Chenault, U.S. Pat. No. 2,865,397 (1958), is an example of such a regulator. One of the problems of that regulator, which is a problem common to regulators that use a piston-sleeve arrangement is that some space must be provided between the piston and the sleeve to allow relative motion between them. This causes some fluid flow as leakage through that space. The space, therefore, becomes a variable orifice yielding increased flow rate with respect to increased input pressure. Tolerance problems can also allow the piston to become skewed within the cylinder, which also results in positive or inaccurate regulation. Insofar as the piston in the prior art devices have output ports that are closed by a portion of the sleeve, the ports must be accurately spaced circumferentially about the piston. Unless the openings are evenly spaced, fluid flow will create a forces urging one side of the piston against the sleeve. This creates inaccurate results because one output port will be more or less restricted than other ports. Thus, flow through each of the ports may differ. Therefore, having multiple ports equally spaced around a sleeve results in non-linear displacement versus flow rate as input pressure changes. If closer tolerances are attempted to limit skewing and leaking around the piston, higher friction results, which necessitates higher pressure losses across the reference orifice to compensate for these frictional losses.

SUMMARY OF THE INVENTION

One of the objects of the present invention is to disclose and provide a fluid flow regulator that is very accurate over a wide range of inlet pressures. Another object of the present invention is to disclose and provide a fluid flow regulator with very low pressure losses. Another object of the present invention is to disclose and provide such a flow regulator that is small, so that it occupies only a small amount of space and can be produced at very low cost without sacrificing accuracy. Another object of the present invention is to disclose and provide a fluid flow regulator that can provide controlled, variable regulation, which is adjustable to cause the flow regulator to yield constant, positive or negative regulation.

The fluid flow regulator of the present invention comprises a cylindrical housing having a main chamber. An inlet is provided at the upstream end of the chamber. A moveable member, preferably a stainless steel ball, is moveable within the chamber. A spring in the housing extends into the chamber and urges the ball towards the inlet end of the chamber. An orifice creates a pressure drop across the movable member. The outlet from the chamber is a radial outlet slot that extends through the housing from the chamber in the region at which the ball normally is located.

Increases in upstream pressure increases the force on the ball to move the ball against the spring and partially closes off the radial slot. In one embodiment, the fluid flows through a longitudinal groove in the chamber side wall, past the ball and then flows through the radial slot. An increase in upstream pressure momentarily increases fluid flow, which increases pressure loss across the moveable member, urging it toward and partially blocking the outlet slot, thereby reducing the fluid flow to its original rate.

A second longitudinal groove, which decreases in size as it nears the outlet slot, may be provided. The second groove, in combination with the ball, effectively increases the orifice size as the moveable member, at lower input pressures, moves away from the outlet slot. The increased orifice size decreases the pressure loss across the orifice, extending the low pressure end and therefore the overall effective range of the regulator.

In another embodiment, the inlet pressure is applied through a main passage to one side of the ball in a main chamber. Another passage connected to the main passage extends to the other side of the ball in the main chamber. An orifice in the main passage downstream of the intersection of the second passage creates a pressure drop in the main passage relative to the pressure in the second passage. As the inlet pressure changes, the pressure drop across the orifice increases the pressure differential to opposite sides of the ball changes. The resulting force differential changes the position of the ball relative to the output port. A higher input pressure urges the ball to block more of the output port so as to compensate for the increased pressure.

In a third embodiment, the orifice extends directly through the ball so that there is a pressure drop across the ball causing a decrease in pressure on the downstream side of the ball. Increased upstream pressure causes a change in the pressure differential on either side of the ball which urges the ball toward the outlet port.

In each of the embodiments, the outlet slot is positioned so that it exits the main chamber from only one side instead of equally spaced around the circumference of the chamber. This arrangement provides an additional vector force upon the ball in a direction from the center line of the ball to the center line of the outlet slot, thereby continuously urging the ball toward the side wall of the chamber nearest the outlet side. Therefore, the ball is not allowed to move from one side of the chamber to the other, which would introduce error in flow rate regulation.

The particular advantages of each of these arrangements and the reasons why they provide improved results are discussed more fully in the "Detailed Description of the Preferred Embodiment."

BRIEF DESCRIPTION OF THE DRAWINGS

FIG. 1 is a side, cross-sectional view of one embodiment of the flow regulator of the present invention.

FIG. 2 is a top view of the first embodiment of the flow regulator of the present invention, partially in section, taken through plane II—II in FIG. 1.

FIG. 3 is an end sectional view of the flow regulator taken through plane III—III in FIG. 1.

FIG. 6 is a sectional view of a modified version of the second embodiment of the flow regulator of the present invention.

DETAILED DESCRIPTION OF THE PREFERRED EMBODIMENTS

Figure 4:
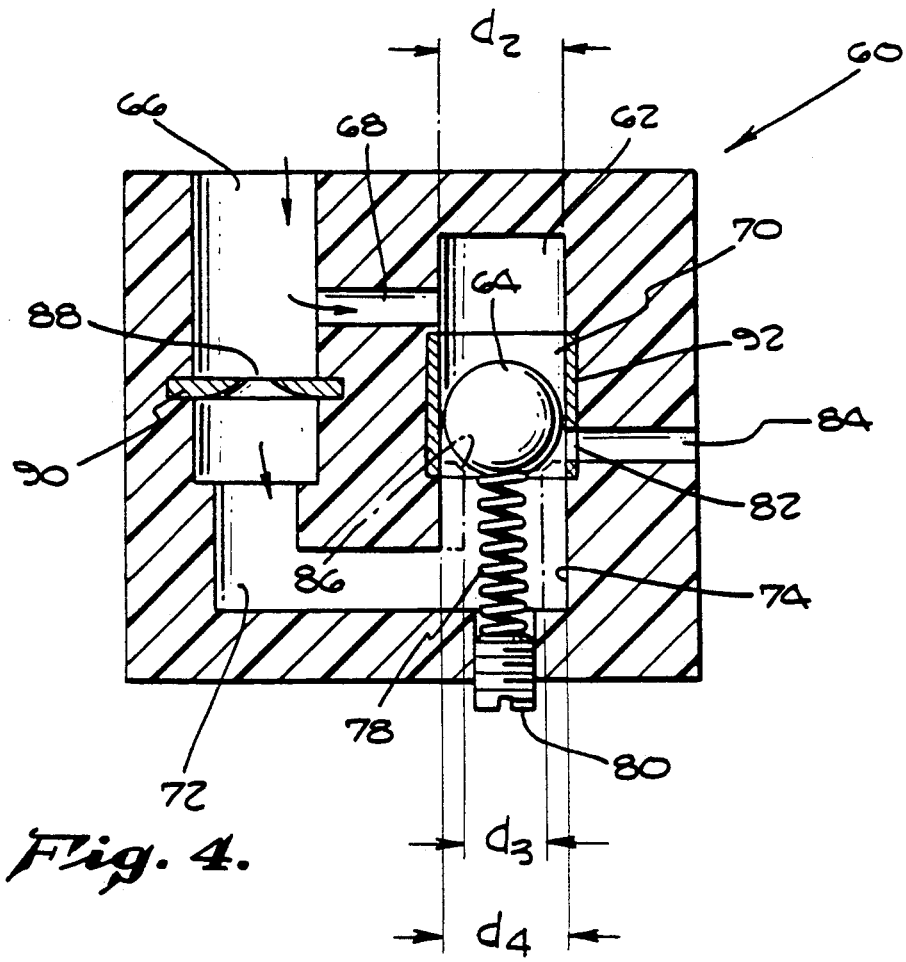
FIG. 4 is a sectional view of a second embodiment of the flow regulator of the present invention.

The fluid flow regulator of the present invention comprises a housing 10 having a control chamber 16. In the first exemplary embodiment (FIGS. 1-3), fluid flow housing 10 is designed to be incorporated into a larger device, primarily a soft drink dispenser. As FIG. 3 shows, housing 10 is cylindrical. O-ring 12 in circumferential groove 14 seals the housing to the larger device. Chamber 16 is at one side (left side in FIGS. 1 and 2) of housing 10.

The housing may be formed of many suitable materials. Prototypes may be machined, but production units are preferably injection molded plastic of a type chosen to be compatible with the beverages being dispensed. Molded plastic parts can be formed with a relatively high tolerance. As will be explained in more detail, close tolerance are not as important in the present invention as in prior art piston-sleeve flow regulators. This slight decrease in tolerance coupled with the ability to use injection molded parts in the present invention can result in significant cost savings. As explained in more detail, moreover, the present invention out-performs prior art flow regulators.

Chamber 16 has an inlet extending from the chamber to the outside of the housing. In the first exemplary embodiment, inlet 18 is at the end of the bore that forms main chamber 16. The inlet end of the main chamber has a circumferential groove 20 in which inlet O-ring 22 seats. O-ring 22 mates with upstream structure to seal the inlet end of the housing to that structure. Thus, fluid flows from upstream of the device through inlet 18 into chamber 16.

A moveable member is received within chamber 16. In the first exemplary embodiment, moveable member 26 is a stainless steel ball. It has a diameter slightly less than the diameter d (FIG. 2) of chamber 16. Although a sphere is the preferred shape for the ball because of ease of manufacturing to high tolerance and their availability, a ellipsoid or similar shape could also be used as long as it presents a curve in the longitudinal direction. As the pressure forces on the upstream side 28 and the downstream side 30 (FIGS. 1 and 2) of ball 26 change relative to each other because of changes in upstream fluid pressure, the ball moves longitudinally in the chamber. Ball 26 thus divides chamber 16 into a left or higher pressure side 28 and a right or lower pressure side 30.

Pressure dividing means including an orifice or other pressure drop means divide the fluid to opposite sides of ball 26. Pressure drop means provide unequal pressure on opposite sides of ball 26 to create a higher pressure side and a lower pressure side of the ball. That is, a orifice creates a pressure drop so that fluid downstream from the orifice is at a lower pressure than fluid upstream from the orifice. The pressure dividing means may be in the form of bypass means, which extends from the inlet into the lower pressure end of the control chamber for urging the moveable member away from the outlet. The details of outlet 42 in the first exemplary embodiment (FIGS. 1-3) are discussed in more detail below. It is sufficient at this point to recognize that fluid in lower pressure area 30 flows past ball 26 to outlet slot 42.

In the first exemplary embodiment, the bypass means comprises at least one primary longitudinal groove 34 which extends along the inside of the chamber 16 adjacent ball 26 (FIG. 1). In this embodiment, primary groove 34 extends along the top (FIGS. 1 and 3) of the chamber from inlet 18 on the left to the right, lower pressure side 30 of chamber 16. It is easier to form a prototype if primary groove 34 extends all the way to the inlet end of the chamber, It is unnecessary to do so in the molded version. The first exemplary embodiment also has a secondary longitudinal groove 38, opposite the first groove 34, which is discussed below.

Ball 26 blocks the flow of fluid from higher pressure end 28 to the lower pressure end 30 of chamber 16 except that fluid can flow around ball 26 through primary longitudinal groove 34. The region of the primary longitudinal groove 34 adjacent ball 26 creates an orifice 36. Fluid in right side 30 of chamber 16 is at a lower pressure than fluid on the left side 28 because of the pressure drop through orifice 36. Orifice 36 can be considered dividing means because it acts to divide flow to different sides of ball 26.

In this embodiment, the pressure on the inlet or left side 28 is greater than the pressure on the right side 30 because of the pressure drop encountered as the fluid flows through orifice 36 that groove 34 creates. Fluid that flows past orifice 36 into the right side 30 of chamber 16 exits the chamber through a radial outlet slot or port 42 (FIGS. 1–3). Outlet slot 42 is perpendicular to longitudinal groove 34. FIG. 2 shows that ball 26 is normally positioned adjacent radial outlet slot 42, but there is still space for the fluid to flow from right side 30 of the chamber past the ball into the radial outlet slot 42.

Bias means in the form of a spring 44 extends into the chamber and contacts ball 26. In the first exemplary embodiment, spring 44 extends through bore 56 between ball 26 and adjustment member 48. One end 50 of adjustment member 48 is threaded into threaded bore 52 (FIG. 1) and extends partially out of housing 10. The other end of adjustment member 48 contacts the spring. O-ring 54 seals bore 46. When one rotates the adjustment member, it moves in or out and changes position. As a result, spring 44 moves an equal distance and changes the normal position of ball 26. The adjustment is designed to be done once and is not done during operation.

The flow rate through inlet 18 is a function of pressure difference across orifice 36, which longitudinal groove 34 and ball 26 create. Bias spring 44 is preset to counter the force created by the pressure difference across orifice 36 at the desired flow rate. As pressure at inlet 18 increases, the instantaneous pressure drop across orifice 36 also increases. Therefore, the instantaneous pressure difference between the higher pressure, left side 28 increases relative to the lower pressure, right side 30, which urges ball 26 to the right (FIGS. 1 and 2) partially closing outlet port 42. The partial closing of outlet port 42 causes a pressure increase in right side 30, which returns the pressure difference across orifice 36 and the resulting flow rate to proper levels.

Outlet slot 42 is located on one side of the chamber only. Holes or slots spaced around housing 10 but not interfering with longitudinal slots 36 and 38 may be acceptable. A single radial outlet slot reduces the overall distance that ball 26 must travel between a fully opened and a fully closed positions. Decreasing the distance reduces errors caused by the force rate change of spring 44.

To elaborate, the force that spring 44 exerts on ball 26 is a function of the compression of the spring. Introducing changes in force as a function of distance brings non-linearities into the system. Therefore, it is desirable to minimize the distance that ball 26 travels. A radial slot can be closed with minimum movement of the ball. Also, a slot 42 on one side of housing 10 also provides a more efficient valving action resulting from less leakage around the ball. The force vector on the ball resulting from the pressure drop across the outlet opening 42 urges the ball toward that slot. Moreover, the force created by the pressure drop across the outlet increases exponentially as ball 26 closes more of radial outlet slot 42. This force increases compensates for the force rate change of the spring and the unregulated leakage around the ball 26.

Figure 5:
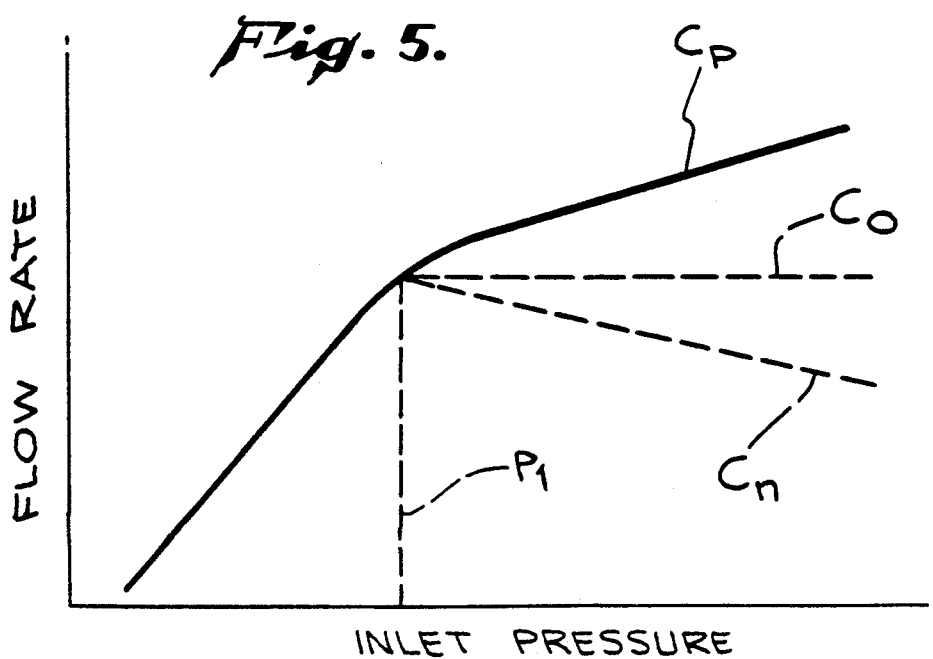
FIG. 5 is a graph of flow rate versus pressure for typical devices and for the capabilities of the device of the present invention.

The concept of negative regulation is shown in the graph in FIG. 5. The X-axis shows pressure, and the Y-axis shows outlet flow rate. At pressures below pressure $p_1$, flow rate increases essentially linearly with increased pressure. Flow regulators are not designed to regulate pressures below a certain minimum, and the flow regulator of the present invention does not regulate below pressure $p_1$. An ideal flow regulator would follow curve $C_0$. That is, increasing inlet pressure above pressure $p_1$ results in a constant flow rate. Prior art flow regulators tend to approach curve $C_p$, so called positive regulation. Flow rate increases with respect to increased pressure. The slope of curve $C_p$ varies for different types of flow regulators.

Although the negative regulation's primary purpose is to compensate for the normal positive regulation, it may be desirable to provide for negative regulation, following curve $C_n$ in FIG. 5. That is, one could actually decrease the flow rate at higher pressures. The present invention provides means for changing the degree of flow regulation.

In the first exemplary embodiment, adjustable orifice means extends between ball 26 and the walls of the chamber for changing the pressure difference and thus the force distribution on opposite sides of the ball. In this embodiment, the adjustable orifice means comprises previously mentioned secondary longitudinal groove 38, which extends from the left of ball 26 slightly to the right of the plane p (FIG. 2) where the outside diameter of ball 26 contacts the wall of the chamber. The space between the right end of secondary longitudinal groove 38 and the surface of ball 26 creates an inlet orifice 40 (FIG. 1). The size of the orifice changes as ball 26 moves in response to changes in upstream pressure. Increased upstream pressure moves the ball to the right as previously discussed. The ball decreases the size of inlet orifice 40, which increases the pressure drop across the ball, urging it further towards the outlet slot 42, reducing the flow rate to its original value.

Because inlet orifice 40 is variable, and because the orifice becomes smaller to increase the pressure drop through it with increasing upstream pressure, one can control the degree to which the pressure differential between opposite sides of the ball changes as the inlet pressure changes. Thus increased upstream pressure can yield a decrease in outlet flow rate. Proper size and shape of secondary longitudinal groove 38 coordinated with a size and shape of primary longitudinal slot 34 changes the ratio of pressures on the higher pressure left and lower pressure right side of ball 26. These pressure ratios result in changes in the regulation curve of FIG. 5.

Rather than using two longitudinal slots 34 and 38, a single longitudinal slot varying in size along its length can serve the function of two slots. For Example, FIG. 3 shows a taper 56 in phantom, which could change the pressure relationship.

The flow regulator of the second embodiment of the present invention (FIGS. 4 and 6) includes a housing 60, which is formed of injection molded plastic. The material of housing 60 is chosen to be compatible with the fluid passing through it.

Cylindrical control chamber 62 is located within housing 60. Moveable member 64 in the form of a stainless steel ball has a diameter slightly less than the diameter $d_2$ of control chamber 62 so that it can move within the chamber. Although very close tolerances are not as crucial in the present invention as they are in prior art, piston-sleeve flow regulators, it is desirable to maintain close tolerance between ball 64 and the inner wall of chamber 62 to minimize fluid flow from high pressure end 70 of chamber 62 around ball 64 to low pressure end 74.

An optional, stainless steel sleeve 92 may be inserted into chamber 62 to maintain this close tolerance. Sleeve 92 also minimizes changes in flow rate as a function of temperature because the coefficient of temperature expansion of the stainless steel sleeve 92 is usually less than the coefficient of most molded plastics. Also, if both ball 64 and sleeve 92 are of the same stainless steel material, they expand and contract together. Sleeve 92 is optional and adds to the cost. Acceptable results are obtained without the sleeve for most applications.

Fluid under pressure enters inlet 66. Pressure dividing means divide the fluid to two sides of ball 64. Fluid flowing into inlet 66 flows through inlet orifice 88 formed by a washer 90. Inlet orifice 88 establishes a reference for a pressure differential across ball 64. The washer 90 that creates orifice 88 is preferably constructed of a material such as stainless steel, which exhibits a low temperature expansion coefficient and a high structural strength. The cross section of the orifice can be made very thin to minimize the effects of viscosity changes.

The majority of the fluid passes from inlet 66 through orifice 88, chambers 72 and 74 and exits through outlet port 84. If sleeve 92 is used, it has an opening 82 at outlet port 84 so that the sleeve does not block the port. Flow regulation occurs because ball 64 partially blocks outlet port 84 (and opening 82 in the sleeve, if the sleeve is used). The degree to which the ball covers the outlet port depends on the pressure difference across ball 64, which in turn, is established by flow rate through orifice 88 and the adjustable spring bias 78. In this embodiment, except for leakage around ball 64, fluid does not flow through channel 68 into high pressure end 70 of chamber 62. The fluid in high pressure end 70 provides a reference pressure to act against ball 64.

The position of ball 64 is a function of the pressure force in high pressure end 70 versus the pressure force in lower pressure end 74 plus the force of spring 78. A screw adjustment member 80 adjusts the force that spring 78 applies on ball 64 for original calibration.

As upstream pressure at inlet 66 increases above an original pressure, the instantaneous pressure drop across orifice 88 also increases. This change in the pressure drop across the orifice increases the pressure at higher pressure end 70 relative to the pressure in lower pressure end 74 which causes increased pressure across ball 64. The pressure difference urges the ball downward. The downward movement increases the degree to which the ball blocks outlet port 84, which in turn decreases the flow rate out of the outlet port to its original level.

Alternatively, the walls forming chambers 70 and 74 could be constructed to conform to the curvature of the ball 64 with the outlet slot 82 entering one side of chamber 70 at or near the midpoint of the curved section.

This configuration provides a superior valve between the ball 64 and outlet slot 82, which permits looser tolerances of the sidewalls of chamber 70 and also generates an additional vector force upon ball 64, which increases as ball 64 moves toward the outlet slot 82. This force can be used to compensate for the additional unregulated fluid which leaks past the ball and side wall of chamber 70, caused by the looser tolerances.

As shown in FIG. 4 (by phantom lines) and in FIG. 6, the distance between the walls forming chamber 74 may be decreased from $d_4$ to $d_3$, and chamfer 86 may be used.

The third exemplary embodiment (FIGS. 7 and 8) also uses a curved wall adjacent its outlet port. The force relationships and the desirability of a curved wall is discussed in more detail when the structure of that third embodiment is explained.

Figure 7:
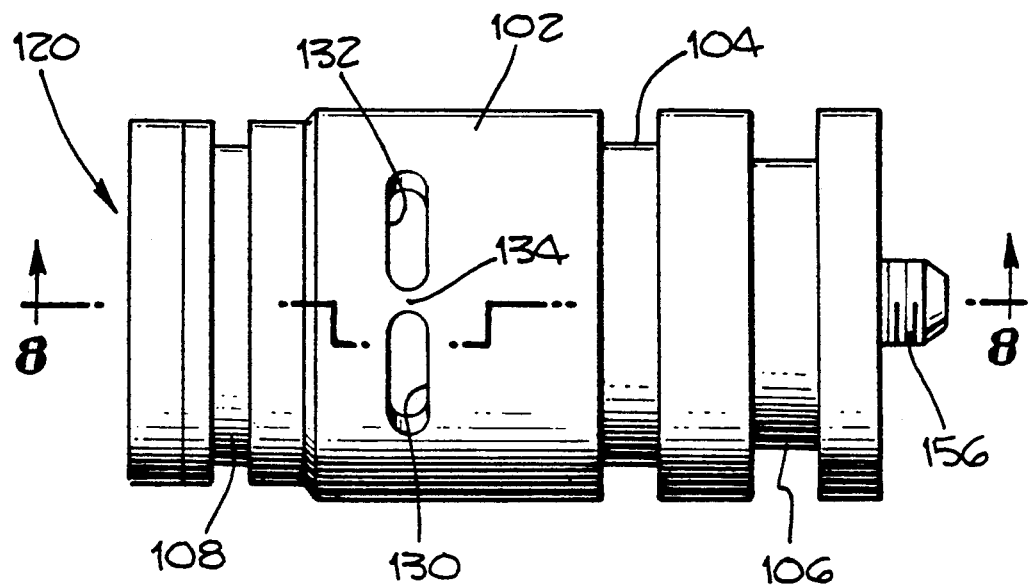
FIG. 7 is a plane view of a third embodiment of the flow regulator of the present invention.
Figure 8:
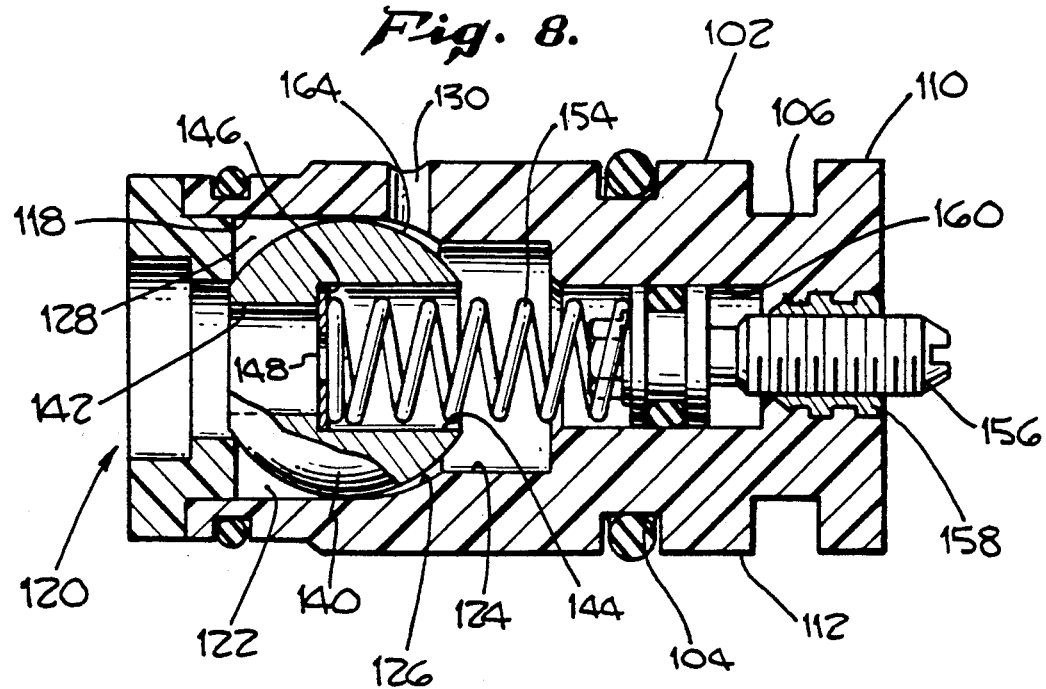
FIG. 8 is a sectional view taken through plane 8—8 in FIG. 7.

FIGS. 7 and 8 illustrate the third embodiment of the flow regulator of the present invention. That embodiment has a generally cylindrically housing 102 of a stable material such as injection molded plastic. Housing 102 has several external grooves, 104, 106 and 108 and circumferential flanges 110 and 112. The flanges mate with structure on a beverage dispenser or other fluid dispensing device. Flange 112 also has a region 114 (FIG. 8) that mates with a corresponding groove on the beverage dispenser for proper rotational position of the flow regulator. O-rings or other seals (not shown) may be provided in the circumferential grooves.

Housing 102 has a cylindrical bore 118 extending from the inlet or upstream end 120 (FIG. 8) to form a main chamber 122. In this exemplary embodiment, the wall at the downstream end 124 curves beginning at 126. Two ports 130 and 132 (FIGS. 7 and 8) extend through the housing perpendicular to the longitudinal axis of chamber 122. Note that the two outlet ports are adjacent to each other (FIG. 7). In prior art flow controllers using piston-sleeve arrangements, it is crucial that radial forces on the piston be equal so that the piston does not skew relative to the sleeve. Insofar as a portion of the piston might cover more of one outlet port than another, unequal radial forces can create faulty results. On the other hand, the present invention in this and in other embodiments has the outlet port or ports on one side of the flow controller because the device can take advantage of changing force vectors with changing upstream pressure for more accurate or even negative flow regulation.

The ball in this embodiment is modified from the ball in the first two embodiments. Ball 140 (FIG. 8) has a pair of bores 142 and 144. In FIG. 8, bore 142 is slightly smaller than bore 144 to accommodate a thin washer type orifice 148, which is press fit into bore 144 against shoulder 146.

A fluid flowing from inlet end 120 passes through orifice 148 to reach lower pressure end 124 of the chamber. End 124 is at a lower pressure than the pressure in higher pressure end 128 of main chamber 122 because of the pressure drop of the fluid as it passes through orifice 148. Thus, the orifice through the ball in this embodiment replaces orifice 88 and the bypass structure of the second embodiment (FIGS. 4 and 6).

One end of adjustable spring 154 extends into bore 144, and the other end of the spring connects to an adjustment screw 156 in sleeve 158. Spring 154 extends through a narrower bore 160 in housing 102. The spring counteracts pressure forces acting from the higher pressure inlet end 120 on ball 140 and initially positions the ball. The spring constant is chosen for the anticipated conditions to be encountered. The screw adjustment allows fine tuning of the device. It is anticipated that this adjustment will take place once.

The flow controller of this embodiment operates in the following manner. Assuming constant upstream pressure at inlet 120, fluid flows through orifice 148 to the low pressure side 124 of ball 120. Because of the pressure drop through orifice 148, the pressure on the upstream side 128 of the ball is greater than the pressure on the downstream side 124. This pressure differential creates a resultant force to the left (FIG. 8) against the corresponding force to the right caused by spring 154.

Fluid that flows through orifice 148 then flows through low pressure end 124 and out ports 130 and 132. At a given upstream pressure and flow rate, the bottom portion 164 of ball 140 (FIG. 8) partially blocks ports 130 and 132 yielding a predetermined flow rate through the ports. That flow rate can be calibrated by modifying or adjusting spring 154.

If upstream pressure increases, the instantaneous pressure drop through orifice 148 also increases. As a result, the pressure differential between higher pressure end 128 and lower pressure end 124 also increases. Therefore, the force from the pressure on the left (upstream) side of the ball increases relative to the pressure on the right (downstream) side of the ball, and the ball moves to the right in FIG. 8. This downstream (right) movement causes the bottom portion 164 of ball 140 to cover more area of ports 130 and 132. This action compensates for the increased upstream pressure. If upstream pressure decreases, the changing pressure forces move ball 140 to the left (FIG. 8) so that the ball covers less area of ports 130 and 132. The larger area compensates for the decreases upstream pressure to keep output flow constant.

It is desirable to have two ports 130 and 132. Ball 140 essentially makes point contact with the inside wall of bore 118. As the ball is urged to the right, this minimal contact minimizes frictional forces between the wall of the bore and the ball. Therefore, the ball can move freely to the right. If there were a single output slot, ball 140 would have to move into that slot where it could be "hung up." Instead, ball 140 moves along the inside surface of a bridge 134 (FIG. 7) between the two ports. Therefore, ball 140 partially covers output ports 130 and 132 as it slides to the right along the inside of bridge 134, but it does not "hang up" on either port. The ports should have sharp edges and care should be undertaken to eliminate any flash created when housing 102 is molded.

Note that outlet ports 130 and 132 are wide in the circumferential direction but narrow in the longitudinal direction. Therefore, relatively small longitudinal movements of the ball 140 tend to block a greater portion of the output ports. It is desirable to minimize the movement of the ball 140 because the minimization decreases the effect of the variations in the spring constant of spring 154.

The vector force upon ball 140 increases as the pressure at inlet 120 increases due to the outlet ports' 130 and 132 placement to only one side of housing 102. When pressure at inlet 120 is at its lowest point where regulation occurs, the ball 140 is positioned near the inlet 120, resulting in little pressure loss from chamber 124 to outlet ports 130 and 132 which are totally unblocked. Therefore, the only vector force upon ball 140 is that force due to the pressure loss across orifice 148 being applied at the acute angle from the center line of ball 140 toward the center line of the outlet ports. Thus the vector force is quite small.

As the pressure at inlet 120 increases, the ball 140 moves to block outlet ports 130 and 132, which causes an increasing pressure loss from chamber 124 to outlet ports 130 and 132. Therefore, the vector force upon the ball 140 is that force due to the pressure loss across orifice 148 plus that force due to the pressure loss from chamber 124 to ports 130 and 132.

If the regulator had outlet ports on opposing sides, as most prior art devices, the vector forces from ports on opposing sides would cancel.

Leakage flow around ball 140 or any piston-sleeve regulator increases with increasing inlet pressure which normally causes positive regulation. See curve $C_p$, FIG. 5. The vector forces in the present invention provide a negative regulation curve as indicated by curve $C_n$, FIG. 5. The resultant of these two curves then exhibit the ideal curve $C_o$, FIG. 5.

The curvature of the wall beginning at 126 on the main bore 118 provides a better valve action between ball 140 and outlet ports 130 and 132 and a greater vector force upon the ball due to the increasing vector angle as ball 140 nears outlet ports 130 and 132.

The vector forces may be used to compensate for greater error due to leakage around the ball 140, therefore further decreasing the required tolerance of the molded parts.

Prior art devices that provide circumferential spacing of the outlet ports cannot control the degree of regulation as the present invention can.

The interaction of ball 140 and outlet ports 130 and 132 can be compared in some degree to the interaction of a bathtub stopper and a drain. As a stopper moves closer toward a drain, the pressure difference between the underside of the stopper and the top of the stopper increases dramatically so that when the stopper get sufficiently close to the drain it snaps into it. Of course, in the present invention, this ball does not completely close ports 130 and 132, but the changes in the resulting force vectors can move this ball more tightly over a larger area of outlet ports 130 and 132.

This application earlier discussed the difficulty that prior art devices had in providing a flat regulation curve or even a negative one. The prior art devices had undesirable positive regulation. That effect resulted, in part, because there had to be some necessary leakage of fluid between the piston and sleeve, and the amount of leakage would increase with increased upstream pressure. Although there is leakage in the present invention, (in this and the other two embodiments), the invention compensates for the leakage. In this embodiment, the compensation results from the curvature beginning at 126 and the vector changes in the pressure.

Because numerous modifications and alternate embodiments will occur to those skilled in the art, it is intended that the invention be limited only in terms of the appended claims.

I claim:

1. A fluid flow regulator for the delivery of a fluid downstream to the regulator at a controlled rate relative to the upstream fluid pressure, the regulator comprising:
   a. a housing having an inlet into the housing for receiving the fluid from upstream of the regulator, a main chamber communicating with the inlet and an outlet communicating with the main chamber for delivering the fluid downstream of the regulator;
   b. a spherical moveable member received within the main chamber adjacent to and partially covering the outlet and having a diameter slightly less than the diameter of the main chamber;
   c. pressure dividing means for dividing the fluid to opposite sides of the moveable member, the pressure dividing means including pressure drop means for dropping the pressure of the fluid at the inlet to a lower pressure in the main chamber, the pressure drop means providing unequal pressure on the opposite sides of the moveable member to create a higher pressure side of the moveable member communicating with the outlet;

d. bias means in the housing and extending into the main chamber in contact with the moveable member for biasing the moveable member against higher pressure force on the moveable member, the moveable member being moveable in response to changes in the upstream pressure which causes changes in the pressure drop through the pressure drop means to change the resulting forces on the movable member, the movable member moving in response to the changes in the resulting forces to change the blockage of the outlet.

2. The fluid flow regulator of claim 1 wherein the main chamber has an outer wall, the pressure dividing means comprises a primary longitudinal slot in the outer wall extending past the moveable member from the higher pressure side to the lower pressure side.

3. The fluid flow regulator of claim 2 wherein the outlet means comprises a radial outlet slot perpendicular to the primary longitudinal slot.

4. The fluid flow regulator of claim 3 further comprising a secondary longitudinal slot in the chamber extending from the higher pressure side of the moveable member and terminating in an end in the lower pressure side of the moveable member adjacent to the moveable member to create a variable orifice between the moveable member and the end of the secondary longitudinal slot in the lower pressure side of the moveable member, the size of the variable orifice being dependent on the position of the moveable member relative to the end of the secondary longitudinal slot.

5. The fluid flow regulator of claim 1 further comprising adjustable orifice means between the moveable member and the chamber for changing the pressure force difference between the higher and the lower pressure sides of the moveable member as the position of the moveable member relative to the outlet means changes in response to changing pressure at the inlet means.

6. The fluid flow regulator of claim 1 wherein the pressure dividing means comprises at least a high pressure channel and a low pressure channel, both channels communicating with the inlet means, the pressure drop means comprising an orifice in the low pressure channel for lowering the pressure in the low pressure channel relative to the pressure in the high pressure channel.

7. The fluid flow regulator of claim 6 wherein the low pressure channel terminates on one side of the ball and projects a first area on the ball, the high pressure channel extending to the main chamber and projecting a second area on the ball, pressure from the fluid in the main chamber from the high pressure channel acting on the second area on the ball, the second area being greater than the first area.

8. The fluid flow regulator of claim 7 wherein the outlet is positioned to be partially covered by the moveable member.

9. The fluid flow regulator of claim 8 further comprising a surface in the main chamber directing the moveable member toward the outlet means as the moveable member moves toward the surface.

10. The fluid flow regulator of claim 6 wherein the bias means extends at least partially through the low pressure channel to contact the moveable member.

11. The fluid flow regulator of claim 1 wherein the pressure dividing means comprises a bore through the moveable member.

12. The fluid flow regulator of claim 11 wherein the pressure drop means comprising an orifice in the bore.

13. The fluid flow regulator of claim 1 wherein the pressure dividing means further includes a bore through the moveable member.

14. The fluid flow regulator of claim 13 wherein the pressure drop means comprising an orifice in the bore.

15. The fluid flow regulator of claim 1 wherein:

said moveable member is received within the chamber and positionable to create a pressure drop for fluid flowing from the chamber into the outlet; and said dividing means extends from the inlet and comprise a high pressure channel extending from the inlet into the chamber on one side of the moveable member, the pressure from the fluid in the higher pressure channel urging the moveable member toward the outlet to increase the pressure drop between the chamber and the outlet, the dividing means also comprising a lower pressure channel extending into the chamber to create a pressure force on the side of the moveable member opposite where the force from the high pressure channel is applied, fluid from the inlet flowing through the lower pressure channel communicating with the outlet for flowing into the outlet.

16. A fluid flow regulator comprising:

a. an inlet communicating with an upstream source of fluid;

b. an outlet communicating with the inlet through a chamber downstream from the inlet, the chamber having an inner surface;

c. a moveable member received in the chamber and moveable along a longitudinal direction to a position partially blocking the flow of fluid from the inlet to the outlet, the moveable member dividing the chamber into a higher pressure end and a lower pressure end, the moveable member having an outer surface, and having at least two points spaced in the longitudinal direction along the outer surface of the moveable member, the two points having different distances from the inner surface of the chamber;

d. bias means contacting the moveable member and urging the moveable member away from the outlet;

e. bypass means extending from the inlet into the lower pressure end of the chamber for creating pressure in the lower pressure end of the chamber to create forces urging the moveable member away from the outlet; and f. pressure drop means between the inlet and the chamber for lowering the pressure in the lower pressure end and raising the pressure in the higher pressure end of the chamber forces in the higher pressure end urging the moveable member toward the outlet to cover part of the outlet.

17. The fluid flow regulator of claim 1 wherein:

said pressure dividing means includes at least one primary, longitudinal slot along the inside of the main chamber, the primary longitudinal slot extending adjacent the moveable member to create an orifice between the moveable member and the main chamber;

said outlet is to the outside of the housing; and said bias means for biasing the moveable member against fluid flow through the inlet.

18. The fluid flow regulator of claim 17 wherein the moveable member divides the main chamber between an upstream and a downstream end, the outlet being positioned in the downstream end of the main chamber adjacent the moveable member.

19. The fluid flow regulator of claim 17 wherein the outlet comprises a radial outlet slot perpendicular to the primary longitudinal slot.

20. The fluid flow regulator of claim 19 further comprising a secondary longitudinal slot in the main chamber extending from the upstream end of the chamber and terminating in the downstream end of the chamber adjacent the moveable member to create an orifice between the downstream end of the secondary slot and the moveable member.

21. The fluid flow regulator of claim 17 further comprising a surface in the main chamber directing the moveable member toward the outlet as the moveable member moves toward the surface.

22. A fluid flow regulator comprising:
  a. a housing forming a chamber, an inlet extending into the chamber and an outlet extending out of the chamber, the chamber having an inner surface;
  b. a moveable member moveable along a longitudinal direction received within the chamber between the inlet and the outlet, the moveable member moving in a longitudinal direction at least partially covering the outlet, the moveable member having an outer surface, and having at least two points spaced in the longitudinal direction along the outer surface of the moveable member, the two points having different distances from the inner surface of the chamber;
  c. a bore extending through the moveable member for dividing the chamber into a higher and a lower pressure end;
  d. an orifice in the bore for creating a pressure drop through the bore and generating a lower pressure in the lower pressure end than in the higher pressure end.

23. The fluid flow regulator of claim 22 wherein the outlet comprises a pair of openings from the chamber through the housing.

24. The fluid flow regulator of claim 22 wherein the chamber is formed from a bore in the housing, the housing bore being generally cylindrical from the inlet to the moveable member, the housing bore having a curvature on the side of the housing bore opposite the outlet.

25. A fluid flow regulator comprising:
  a. an inlet communicating with an upstream source of fluid;
  b. an outlet communicating with the inlet through a chamber downstream from the inlet, the chamber having an inner surface;
  c. a moveable member received in the chamber and moveable in a longitudinal direction to a position partially blocking the flow of fluid from the inlet to the outlet, the moveable member dividing the chamber into a higher pressure end and a lower pressure end, the moveable member having an outer surface, and having at least two points spaced in the longitudinal direction along the outer surface of the moveable member, the two points having different distances from the inner surface of the chamber;
  d. bias means contacting the moveable member and urging the moveable member toward the higher pressure end;
  e. a bore through the moveable member through which fluid flows from the higher pressure end to the lower pressure end to create pressure in the lower pressure end to create forces acting against the forces from the higher pressure end, the relative forces moving the moveable member against the bias; and
  f. an orifice at the bore for creating a pressure drop between the higher and lower pressure ends.

* * * * *